United States Patent
Eidel et al.

(10) Patent No.: US 12,411,220 B2
(45) Date of Patent: Sep. 9, 2025

(54) DECOUPLING ELEMENT FOR AN ULTRASONIC SENSOR

(71) Applicant: VALEO SCHALTER UND SENSOREN GMBH, Bietigheim-Bissingen (DE)

(72) Inventors: Oliver Eidel, Bietigheim-Bissingen (DE); Stefan Triebl, Bietigheim-Bissingen (DE); Paul Bou-Saleh, Bietigheim-Bissingen (DE); Nicolas Bellaize, Bietigheim-Bissingen (DE); Fabian Haag, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 54 days.

(21) Appl. No.: 18/579,865

(22) PCT Filed: Jul. 13, 2022

(86) PCT No.: PCT/EP2022/069531
§ 371 (c)(1),
(2) Date: Jan. 17, 2024

(87) PCT Pub. No.: WO2023/001648
PCT Pub. Date: Jan. 26, 2023

(65) Prior Publication Data
US 2024/0361440 A1    Oct. 31, 2024

(30) Foreign Application Priority Data
Jul. 20, 2021   (DE) ............... 10 2021 118 641.2

(51) Int. Cl.
| | | |
|---|---|---|
| *G01S 7/52* | (2006.01) | |
| *G01S 7/521* | (2006.01) | |
| *G01S 15/931* | (2020.01) | |

(52) U.S. Cl.
CPC ............ *G01S 7/521* (2013.01); *G01S 15/931* (2013.01)

(58) Field of Classification Search
CPC ....................................................... G01S 7/521
See application file for complete search history.

(56) References Cited

U.S. PATENT DOCUMENTS

| | | | | |
|---|---|---|---|---|
| 6,250,162 B1 * | 6/2001 | Amaike | .................. | G10K 9/22 310/334 |
| 8,104,351 B2 * | 1/2012 | Jung | ........................ | G10K 9/22 73/632 |

(Continued)

FOREIGN PATENT DOCUMENTS

| | | |
|---|---|---|
| DE | 102012106696 A1 | 1/2014 |
| EP | 2616836 B1 | 12/2014 |

(Continued)

OTHER PUBLICATIONS

International Search Report issued in corresponding German Patent Application No. DE 10 2021 118 641.2 mailed Mar. 16, 2022 (8 pages).

(Continued)

*Primary Examiner* — Travis R Hunnings
(74) *Attorney, Agent, or Firm* — Osha Bergman Watanabe & Burton LLP (57) ABSTRACT

A decoupling element for an ultrasonic sensor is disclosed. The ultrasonic sensor is able to be attached to a flat component for a vehicle. The flat component includes a cutout. The ultrasonic sensor includes a cylindrical ultrasonic transceiver element which is able to be introduced into the cutout. The decoupling element includes a hollow-cylindrical ele- (Continued)

ment for enclosing the cylindrical ultrasonic transceiver element of the ultrasonic sensor and a plurality of support ribs which are arranged in the radial direction outside the hollow-cylindrical element and are spaced apart from one another in a circumferential direction of the hollow-cylindrical element for supporting the decoupling element on a region of the flat component outside the cutout when the cylindrical ultrasonic transceiver element with the hollow-cylindrical element enclosing it is introduced by an end portion at an axial end into the cutout.

15 Claims, 6 Drawing Sheets

(56) References Cited

U.S. PATENT DOCUMENTS

| | | | | |
|---|---|---|---|---|
| 9,383,443 | B2* | 7/2016 | Bartylla | G10K 11/18 |
| 2007/0230273 | A1* | 10/2007 | Nakajima | G01S 7/521 |
| | | | | 340/552 |
| 2007/0230274 | A1* | 10/2007 | Nakajima | G10K 9/22 |
| | | | | 340/552 |
| 2008/0060439 | A1* | 3/2008 | Niemann | G10K 9/122 |
| | | | | 29/592.1 |
| 2008/0232197 | A1* | 9/2008 | Kojima | G01S 15/931 |
| | | | | 367/99 |
| 2009/0195123 | A1* | 8/2009 | Murata | G01S 15/931 |
| | | | | 310/326 |
| 2011/0242941 | A1* | 10/2011 | Tsuzuki | G01S 7/521 |
| | | | | 248/27.3 |
| 2011/0242942 | A1* | 10/2011 | Tsuzuki | G10K 11/004 |
| | | | | 367/121 |
| 2020/0284890 | A1* | 9/2020 | Ueda | H04R 1/00 |
| 2020/0288224 | A1* | 9/2020 | Ueda | G01S 15/931 |
| 2021/0170968 | A1* | 6/2021 | Ueda | B60R 21/01 |
| 2022/0191623 | A1* | 6/2022 | Kobayashi | G01S 7/52004 |
| 2023/0070901 | A1* | 3/2023 | Ueda | G01S 15/931 |
| 2023/0111012 | A1* | 4/2023 | Yamamoto | G01S 15/08 |
| | | | | 367/118 |
| 2023/0417594 | A1* | 12/2023 | Matsushita | G01H 11/08 |
| 2024/0036224 | A1* | 2/2024 | Umemura | G01V 1/186 |
| 2024/0056729 | A1* | 2/2024 | Dobos | G01S 7/521 |
| 2024/0210546 | A1* | 6/2024 | Nakanishi | G01S 7/521 |

FOREIGN PATENT DOCUMENTS

| | | | |
|---|---|---|---|
| EP | 2812723 | B1 | 8/2019 |
| JP | 2012127655 | A | 7/2012 |
| KR | 20160012744 | A | 2/2016 |
| WO | 2015/104094 | A1 | 7/2015 |
| WO | 2017175385 | A1 | 10/2017 |
| WO | 2019/102755 | A1 | 5/2019 |

OTHER PUBLICATIONS

International Search Report issued in corresponding International Application No. PCT/EP2022/069531 mailed Sep. 28, 2022 (5 pages).

Written Opinion issued in corresponding International Application No. PCT/EP2022/069531 mailed Sep. 28, 2022 (6 pages).

Office Action Issued in Corresponding JP Application No. 2024-503615, dated Mar. 25, 2025 (12 Pages with English Translation).

* cited by examiner

DECOUPLING ELEMENT FOR AN ULTRASONIC SENSOR

The present invention relates to a decoupling element for an ultrasonic sensor which can be attached to a flat component for a vehicle, the flat component having a cutout. The invention further relates to an ultrasonic sensor having the decoupling element, an arrangement with the ultrasonic sensor and the flat component, and to a motor vehicle having such an arrangement.

Ultrasonic sensors are used in vehicles to record information about the environment of a vehicle using transmitted ultrasonic pulses and received echo ultrasonic pulses and to transmit information about the environment of the vehicle to a parking assistance system, a driver assistance system or the like.

Figure 1:
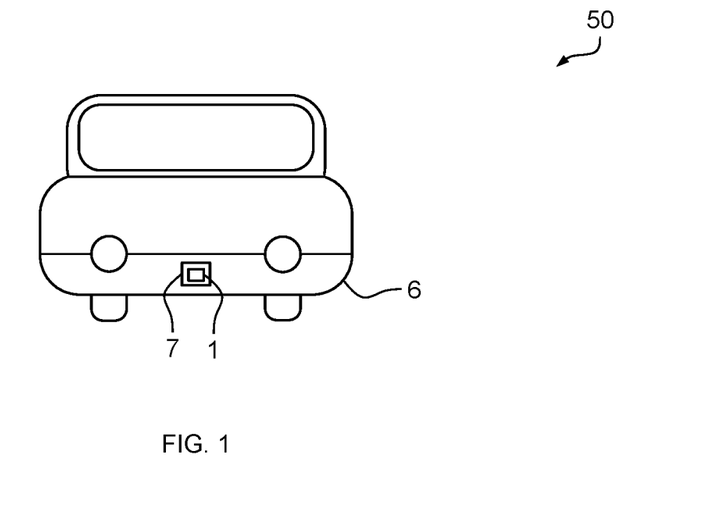
FIG. 1 shows a front view of a vehicle.
Figure 2:
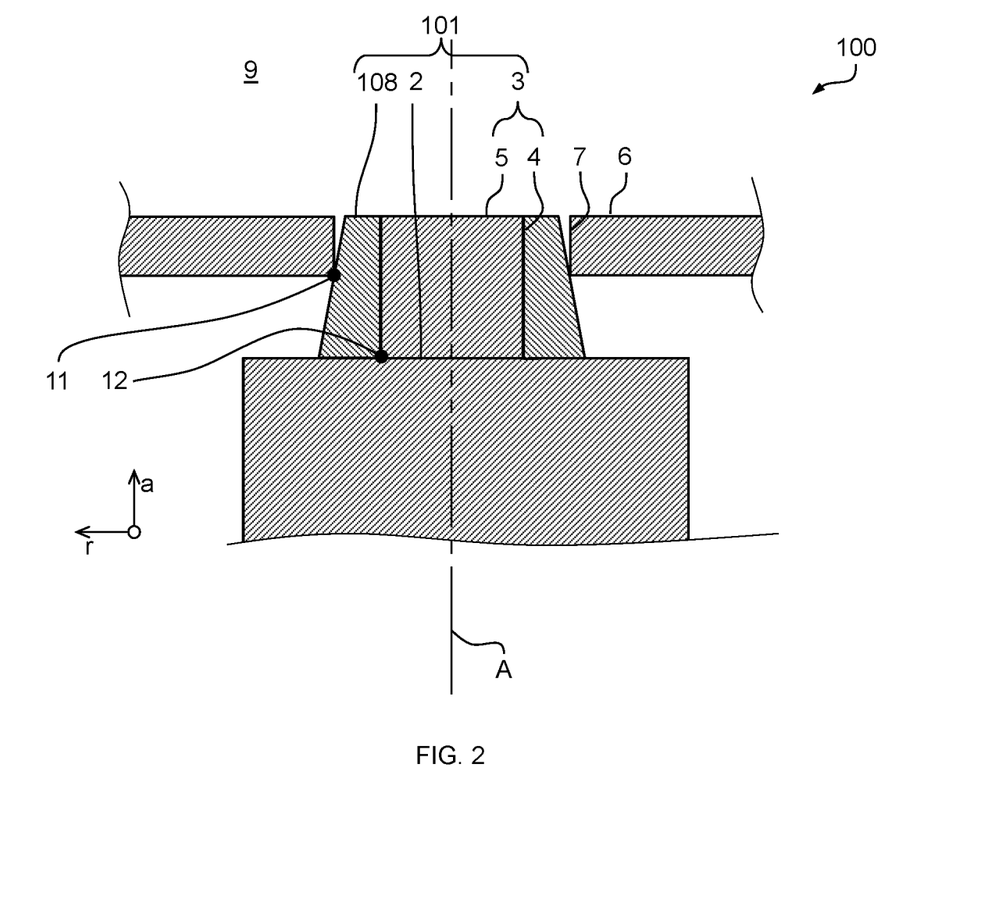
FIG. 2 shows a sectional view of a known arrangement with a flat component and an ultrasonic sensor having a known decoupling element.

FIG. 2 shows a known arrangement 100 with an ultrasonic sensor 1, which is attached to a flat component 6. The ultrasonic sensor 1 has a sensor housing 2 and a membrane pot 3 which protrudes from the latter and has a cylindrical wall 4 which bears a membrane 5, which is used for sending and receiving the ultrasonic pulses into or from an environment 9 of a vehicle (50 in FIG. 1). The membrane pot 3 is introduced by an axial end portion (portion at the end along an axis A) into a cutout 7 in the flat component 6, such as a bumper, of the vehicle (50 in FIG. 1).

In order to prevent vibrations being transmitted from the vehicle body via the flat component 6 to the membrane 5 of the membrane pot 3, a known hollow-cylindrical decoupling ring 108 is provided, which encloses the cylindrical wall 4 of the membrane pot 3 and is introduced together with the latter into the cutout 7. In addition to the vibration decoupling, the decoupling ring 108 also has the function of protecting the membrane pot 3 from moisture and the ingress of water.

The ultrasonic sensor 101 is pressed against the flat component 6 with a predefined contact pressure and thus into the cutout 7. An outer surface of the decoupling ring 108 is conical, and therefore at a point 11 at which the decoupling ring 108 and an edge of the flat component 6 are in contact, a holding force is exerted on the decoupling ring 108. The holding force has a radial component which acts inward in the radial direction r and fixes the membrane pot 3 with the decoupling ring 108 in the cutout 7, and an axial component which presses the decoupling ring 108 in the axial direction a against the sensor housing 2. However, the axial component of the holding force is low, in particular significantly lower than the radial component. In addition, in production-related deviations of the cutout 7 from its desired shape, there may also be no contact between the decoupling ring 108 and the flat component 6 at some points 11 along a circumferential direction and therefore no holding force can be exerted.

It has been recognized that, in the case of the arrangement 100 from FIG. 2, for example when washing the vehicle with a high-pressure cleaner, water may penetrate between the decoupling ring 108 and the membrane pot 3 and/or between the decoupling ring 108 and the flat component 6. Since the holding force component exerted in the axial direction is low, the pressures occurring here tend to push out the decoupling ring 8 in the axial direction outward in the direction of the environment 9 of the vehicle (50 in FIG. 1). Thus, water accumulations may occur in a gap arising between the decoupling element 8 and the sensor housing 2, and in particular at a foot point 12, and may ice up. Such ice bridges may adversely affect the functionality of the membrane pot 3 of the ultrasonic sensor 1. In addition, the decoupling ring 108, when it protrudes over the outer surface of the flat component 6, can be easily damaged or pulled out of the opening.

Figure 3:
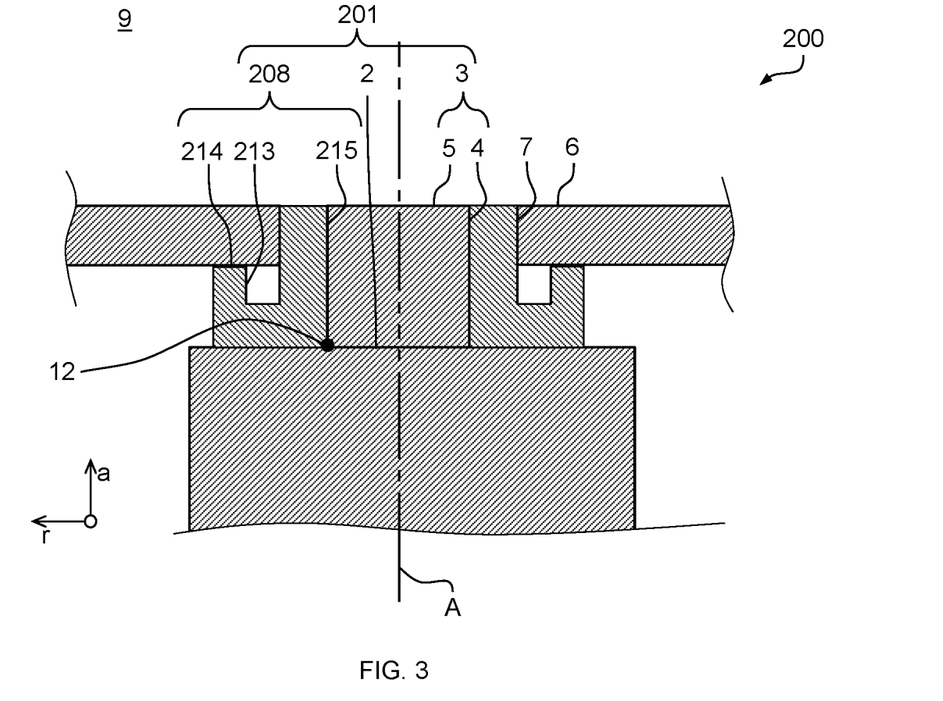
FIG. 3 shows a sectional view of another known arrangement with a flat component and an ultrasonic sensor having a known decoupling element.

Therefore, EP 2 616 836 B1 proposes an arrangement, which is schematically illustrated in FIG. 3. A decoupling element 208 has a plurality of spacer elements 213 which are arranged further outward in the radial direction than the cutout. Top sides 214 of the spacer elements 213 of the decoupling element 208 form a supporting platform for the flat component 6. In this way, the flat component 6 can exert a holding force with a large force component in the axial direction, which presses the decoupling element 8 against the sensor housing 2, even when there is no close contact between a hollow-cylindrical portion 215 of the decoupling element 208 and the flat component 6 due to out-of-roundness of the cutout 7 and the like. Thus, it can be avoided in principle that the decoupling element 208 is pushed upward in the axial direction in FIG. 3 and a gap arises at the foot point 12, in which water accumulates and ice bridges can be formed.

However, in the teaching of EP 2 616 836 B1, an axial dimension of the spacer element 213, a thickness in the axial direction of the flat component 6 and a mounting position of the sensor housing 2 have to be comparatively precisely coordinated with one another. However, a thickness 6 of the flat component may be different for vehicles of different models and also at different positions of one and the same vehicle model. At the same time, it is desirable for the membrane 5 and the outer surface of the flat component 6 facing to the environment 9 to always be flush. If the same type of decoupling element 208 is used for flat components 6 with different thicknesses and the pressing-in is always carried out in such a way that the membrane 5 and the outer surface of the flat components 6 are flush, the contact pressure exerted on the spacer 213 in the axial direction varies according to a force-displacement curve of the spacer element 214. Although the decoupling element 208 has a certain flexibility, in particular with particularly thick flat components 6 the required contact pressure to make the membrane 5 flush with the outer side of the flat component 6 may be prohibitively high and make assembly difficult or impossible. There is also the risk at high pressures resulting from thick, flat components 6 that the spacer element 213 will be squeezed and tilt outward. In this case, in turn, the decoupling element 208 may be pushed upward and a gap may arise at the foot point 11, in which water can accumulate and ice bridges can be formed.

WO 2015/104094 A1 and EP 2 812 723 are further examples of the prior art.

Against this background, the present invention is based on the object of providing an improved decoupling element.

According to a first aspect, in order to achieve the object, a decoupling element is proposed, which involves a decoupling element for an ultrasonic sensor which can be attached to a flat component for a vehicle, the flat component having a cutout, and which has a cylindrical ultrasonic transceiver element which can be introduced into the cutout. The proposed decoupling element has: a hollow-cylindrical element for enclosing the cylindrical ultrasonic transceiver element of the ultrasonic sensor; and a plurality of support ribs which are arranged in the radial direction outside the hollow-cylindrical element and are spaced apart from one another in a circumferential direction of the hollow-cylindrical element for supporting the decoupling element on a region of the flat component outside the cutout when the cylindrical ultrasonic transceiver element with the hollow-cylindrical element enclosing it is introduced by an end portion at an axial end into the cutout. A respective support rib in an axial section of the decoupling element has an archway shape which is open in the axial direction toward another axial end of the hollow-cylindrical element.

The support ribs have an archway shape in the axial section. The archway shape can be described in particular as an archway shape open on one side or hollow or as a rib shape open on one side or hollow. The open or hollow support ribs can advantageously be more easily compressed compared to solid support ribs (i.e. which are not open and not hollow, for example have a convex cross section) and are therefore flexibly used with a larger range of differently thick flat components, that is, they have a more favorable force-displacement curve.

If, in particular, the proposed decoupling element is used with a first flat component, in which an axial dimensioning of the support ribs, a thickness in the axial direction of the flat component and a mounting position of the ultrasonic sensor are precisely coordinated with one another, the archway-shaped support ribs provide high stability and can withstand the force exerted by the flat member on the support ribs, such that the decoupling element is fixed and pressed against the sensor housing. If the proposed decoupling element is used with a second flat component that is thicker, in particular thicker by a factor of 1.5 to 1.6, than the first flat component, the hollow support ribs can be compressed without a prohibitively high contact pressure being required. Even in this case, the ring remains pressed against the sensor housing and does not tilt radially outward.

Thus, it is possible to use one and the same decoupling element for the mounting of ultrasonic sensors on differently thick flat components. The assembly can be carried out more easily. The archway shape may advantageously also counteract tilting away of the support rib outward. At a high contact pressure, the archway shape is advantageously compressed or pressed axially against the sensor housing and radially inward against the ultrasonic transceiver element. Thus, it can be prevented that the decoupling element is pressed axially upward or outward and water accumulations and ice bridges form between the decoupling element, the sensor housing and the ultrasonic transceiver element and may ice up.

Owing to the fact that the plurality of support ribs are spaced apart from one another in the circumferential direction of the hollow-cylindrical element, water which penetrates, for example, when cleaning the vehicle with a high-pressure cleaner between the hollow-cylindrical element and the cylindrical ultrasonic transceiver element can drain off in a region in the circumferential direction, in which no support ribs are arranged.

In particular, "decoupling element" should be understood as meaning an element which a) has the ability to counteract the transmission of vibrations from the flat component of the vehicle body to a membrane of the ultrasonic transceiver element; and b) has the ability to protect the ultrasonic transceiver element from moisture and water.

The flat component may be, for example, a body panel, a bumper or an interior trim panel of the vehicle.

A "cylindrical shape" should be understood here as meaning any geometric shape formed by two mutually geometrically similar end faces and a lateral surface connecting the end faces. Preferably, the two end faces can be congruent to each other. Preferably, the two end faces can be converted into each other by displacement. Preferably, the end faces may be circles or ellipses. Particularly preferably, the cylindrical shape along at least two axial intersecting surfaces may be mirror-symmetrical. Particularly preferably, the cylindrical shape may be rotationally symmetrical or approximately rotationally symmetrical about its axis. An "axis" of the "cylindrical shape", which defines the "axial direction", should be understood as meaning the axis that connects the geometric centers of the end faces to one another.

Accordingly, "cylindrical ultrasonic transceiver element" should be understood as meaning an ultrasonic transceiver element, the outer surfaces of which generally form a cylindrical shape. For example, the ultrasonic transceiver element may be what is referred to as a membrane pot. The term "hollow cylinder element" should be understood as meaning an element that encloses a free space that is generally cylindrical in shape. The decoupling element with the hollow-cylindrical element may be, for example, what is referred to as a decoupling ring. "Generally have a cylindrical shape" should be understood as meaning that deviations from the strictly geometric cylindrical shape, such as grooves, flutes, burrs, ribs and the like on the lateral surface, an inclination of the lateral surface by up to 10°, preferably up to 5° (such that in the geometrically strict sense there is approximately a conical shape and no cylindrical shape), and the like are also intended to be covered by the term "cylindrical shape".

An "axial end" should be understood as meaning, in particular, an end in the direction of the axis of the cylindrical shape. An "axial section" is, in particular, a section through the cylindrical shape containing the axis of the cylindrical shape (cf. axis A in FIGS. 2 to 4).

The "one axial end", in a state in which the decoupling element is attached to the ultrasonic sensor, with the hollow-cylindrical element of the decoupling element enclosing the cylindrical ultrasonic transceiver element, should be understood as meaning that end of the cylindrical ultrasonic transceiver element and of the hollow-cylindrical element of the decoupling element at which a membrane of the ultrasonic transceiver element is located for transmitting and receiving ultrasonic waves. The "other axial end" should therefore be understood as meaning the end opposite the one axial end in the axial direction.

In this description, a side at which the "one axial end" is located is also referred to as "top" and a side at which the "other axial end" is located is also referred to as "bottom". These designations "top" and "bottom" refer to an imaginary direction of the axis of the cylindrical shape, wherein the axial end, in the direction of which ultrasonic waves are emitted, is referred to as the "top" end and the opposite end is referred to as the "bottom" end. The designations "top" and "bottom" expressly do not refer to a mounting situation in the vehicle. The ultrasonic sensor with the decoupling element and the flat component can be mounted in any orientation in the vehicle.

An "archway shape" can be understood as meaning any generally archway-shaped free form. In particular, an "archway shape" can be understood as meaning a shape formed by two limbs which are spaced apart from one another on one side of the archway shape facing the other, lower axial end, and converge on a side of the archway shape facing the one, upper axial end. The limbs may be rectilinear, curved, or rectilinear in sections and curved in sections. A radius of curvature does not need to be constant. The archway shape does not need to be mirror-symmetrical. Examples of an archway shape include an inverted "U" shape and an inverted "V" shape.

According to one embodiment, the archway shape is inclined inward in the radial direction.

In other words, in particular, an uppermost point of the archway shape in the axial direction is arranged further inward with respect to the radial direction, which is orthogonal to the axial direction, than a center point of a distance between the two limbs of the archway shape at the lower end of the archway shape. In particular, a radially inner limb of the archway shape may be shorter than a radially outer limb of the archway shape.

Accordingly, it is prevented even better that the archway-shaped support rib tilts outward under high pressures. Rather, it is more advantageously promoted that the inwardly inclined archway-shaped support rib, if it yields, buckles inward. Thus, it can be reliably prevented that, at a foot point, at which the outer side of the ultrasonic transceiver element, the top side of the sensor housing and the bottom side of the inner limb of the archway-shaped support rib meet, a free space arises, in which water can accumulate.

According to a further embodiment, each of two limbs of the archway shape is at least twice as long as an inner distance between the limbs on the open side of the archway shape.

Accordingly, an archway shape with elongated, slender limbs, which has a particularly favorable force-displacement curve, is proposed.

According to a further embodiment, one end of a radially inner limb of the archway shape in the axial direction on the open side of the archway shape in the axial direction is flush with the other axial end of the hollow-cylindrical element and is connected to the hollow-cylindrical element.

Preferably, the radially outer limb of the archway shape can have a free end, which is in particular not connected to any other element.

Such an embodiment advantageously further promotes that the support rib tilts inward and not outward when subjected to high pressures, and accordingly provides for additional compression at a foot point at which the cylindrical ultrasonic transceiver element, the cylindrical support rib and a top side of the sensor housing meet.

"Being connected" should be understood as meaning, in particular, a one-piece connection. Particularly preferably, the connection may also be integral, which means that the support ribs and the hollow-cylindrical element are formed without joining by primary forming as one part. In this case, a radially inwardly facing outer side of the radially inner limb of the archway shape can be directly connected to a radially outwardly facing outer side of the hollow-cylindrical element. However, a distance may also be provided between the radially inwardly facing outer side of the radially inner limb and the radially outwardly facing outer side of the hollow-cylindrical element, which distance is bridged, for example, by a web running horizontally at the bottom side of the decoupling element at least between the radially inner limb and the hollow-cylindrical element. It should be noted that the horizontally running web may also extend radially outward as far as the radially outer limb of the archway shape and possibly also beyond it.

According to a further embodiment, one of the support ribs in question extends in the circumferential direction of the hollow-cylindrical element over an angular range of 30° to 60°, preferably 40° to 50°, particularly preferably 50°.

If a support rib in question extends over the specified angular range in the circumferential direction of the hollow-cylindrical element, it can, despite its archway shape which is hollow or open on one side, have sufficient rigidity to withstand the exerted contact pressure in a stable manner, so as not to tilt away outward, but rather to be pressed firmly against a foot point at which the outer side of the ultrasonic transceiver element, the top side of the sensor housing and the bottom side of the inner limb of the archway-shaped support rib meet, and therefore no water can accumulate at this point and ice up or push the ring upward.

Here, there can preferably be four or five support ribs, which are spaced apart from one another around the circumferential direction of the hollow-cylindrical element; in this case, there is advantageously enough free space between the support ribs for the drainage of water which has penetrated.

According to a further embodiment, the decoupling element is formed integrally.

Formed integrally should be understood as meaning in particular formed by primary forming in one working step.

An integrally formed decoupling element may have particularly advantageous acoustic properties.

According to a further embodiment, at least the support ribs are formed from a material having a hardness of 20 to 60 Shore A, preferably 30 to 50 Shore A, particularly preferably 40 Shore A.

The entire decoupling element of the material may also be formed from the material having one of the hardnesses mentioned.

The hardnesses mentioned are, on the one hand, suitable for avoiding the transmission of vibrations from the flat component to the ultrasonic transceiver element of the ultrasonic sensor, which can be introduced into the hollow-cylindrical element of the decoupling element. On the other hand, these hardnesses are suitable for achieving a suitable rigidity in the region of the support ribs, with which the support ribs can withstand the exerted contact pressure in a stable manner, so as not to tilt away outward, but rather to be pressed firmly against a foot point at which the outer side of the ultrasonic transceiver element, the top side of the sensor housing and the bottom side of the inner limb of the archway-shaped support rib meet, and therefore no water can accumulate at this point and ice up or push the ring upward.

According to a further embodiment, the decoupling element is formed from a flexible material, preferably a polymer, particularly preferably a silicone.

Preferably, the silicone is a liquid-processed, cross-linked silicone. This provides good resistance to the temperatures of −40° C. to +80° C. to be expected during the operation of a vehicle.

According to a second aspect, an ultrasonic sensor is proposed, which has a cylindrical ultrasonic transceiver element and the proposed decoupling element, wherein the hollow-cylindrical element of the decoupling element encloses the cylindrical ultrasonic transceiver element.

According to a third aspect, an arrangement is proposed with a flat component for a vehicle, the flat component having a cutout, and the ultrasonic sensor of the second aspect, which is attached to the flat component. In this case, the cylindrical ultrasonic transceiver element with the hollow-cylindrical element enclosing it of the decoupling element is introduced by the end portion at the one axial end into the cutout, and the decoupling element is supported on a region of an inner side of the flat component outside the cutout.

According to one embodiment of the arrangement of the third aspect, an axial end of the cylindrical ultrasonic transceiver element and of the hollow-cylindrical element enclosing it of the decoupling element is flush with an outer side of the flat component.

Accordingly, a flush surface can advantageously be provided, for example, on the outer side of the vehicle body.

This is not only esthetically advantageous, but also affords the technical advantage that damage and contamination of the ultrasonic transceiver element are avoided as best as possible.

According to a further embodiment, the flat component is an outer peripheral surface of the vehicle, the outer side of the flat component is a vehicle outer side, and the inner side of the flat component is a vehicle inner side.

Accordingly, the ultrasonic sensor can be used to record information about an environment of the vehicle.

According to a further embodiment, the flat component is an interior trim panel of the vehicle, the outer side of the flat component is a vehicle inner side, and the inner side of the flat component is a vehicle outer side.

Accordingly, the ultrasonic sensor can also be installed on an interior trim panel of the vehicle and can provide information about an interior of the vehicle, for example about the number of occupants of in a passenger compartment.

According to a further embodiment, the ultrasonic sensor is pressed with the decoupling element into the cutout of the flat component under a predefined contact pressure.

The contact pressure advantageously provides a secure seat of the decoupling element on a surface of the sensor housing via the counterforce acting from the flat component onto the support rib.

According to a further embodiment, the hollow-cylindrical element of the decoupling element is attached with an undersize on the cylindrical ultrasonic transceiver element.

"Attached with an undersize" should be understood as meaning in particular that, before the assembly in a relaxed state of the decoupling element, an inner diameter of the hollow-cylindrical element is smaller than an outer diameter of the cylindrical ultrasonic transceiver element.

Accordingly, the hollow-cylindrical element of the decoupling element can be held by a radially inwardly acting clamping force on the cylindrical ultrasonic transceiver element. Thus, the penetration of water between the hollow-cylindrical element and the cylindrical ultrasonic transceiver element can be counteracted.

According to a fourth aspect, a vehicle with at least one arrangement of the third aspect or one of the embodiments of the third aspect is proposed.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred exemplary embodiments with reference to the accompanying figures.

Identical or functionally identical elements have been provided with the same reference signs in the figures, unless stated otherwise.

FIG. 1 shows a front view of a vehicle according to a first exemplary embodiment, in which it is a passenger car 50. The passenger car 50 has a front bumper, which is an example of a flat component 6. On the front bumper 6, an ultrasonic sensor 1 according to the first exemplary embodiment is mounted in a cutout 7, wherein an arrangement 10 shown in FIG. 3 and described in more detail below is used according to the first exemplary embodiment.

FIG. 2 and FIG. 3 show known arrangements 100, 200 for attaching an ultrasonic sensor 1 to the front bumper 6, which arrangements have already been discussed in the introductory part.

Figure 4:
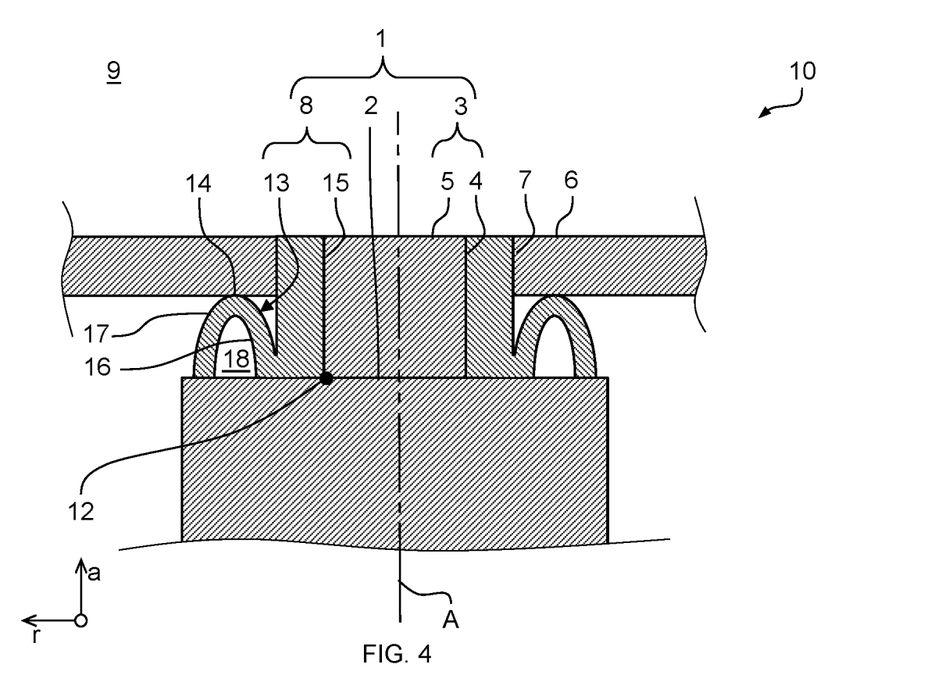
FIG. 4 shows a sectional view of an arrangement with a flat component and an ultrasonic sensor having a decoupling element according to a first exemplary embodiment.

FIG. 4 shows an axial sectional view of an arrangement according to the first exemplary embodiment with the front bumper 6 and an ultrasonic sensor 1, which is attached to the front bumper 6 and has a decoupling element 8 according to the first exemplary embodiment. The ultrasonic sensor 1 has a sensor housing 2 and a membrane pot 3 which protrudes therefrom and is an example of an ultrasonic transceiver element. The membrane pot 3 has a cylindrical wall 4, which bears a membrane 5. The membrane 5 is used for sending and receiving ultrasonic pulses into or from an environment 9 of the vehicle (50 in FIG. 1). The membrane pot 3 is introduced by an upper axial end portion (portion at the end along an axis A) into a cutout 7 in the bumper 6.

It should be noted that in the figures the arrow marked with "a" points upward in the axial direction defined by the axis A. Here "above" refers to the image plane in FIG. 4 and should not be understood as a restriction with regard to the mounting position of the arrangement 10. The arrow labeled "r" points outward in the radial direction orthogonal to the axial direction.

In order to prevent vibrations being transmitted from the vehicle body via the front bumper 6 to the membrane 5 of the membrane pot 3, the decoupling ring 8 is provided, which is an example of a decoupling element 8. The decoupling ring 8 has a hollow-cylindrical element 15 and a plurality of support ribs 13 arranged in the radial direction outside the hollow-cylindrical element 15. Although this cannot be seen in FIG. 4, the plurality of support ribs 13 are spaced apart from one another in the circumferential direction of the hollow-cylindrical element 15.

The uppermost points 14 of the support ribs 13 form a supporting plateau for the front bumper 6. In particular, the ultrasonic sensor 1 is introduced or pressed into the cutout 7 of the front bumper 6 under a predefined contact pressure with a portion on its axial upper end such that the membrane 5 and an outer side of the front bumper 6 are flush, as shown in FIG. 4. In this state, the decoupling ring 8 is supported by means of the support ribs 13 on a region of a lower outer surface of the front bumper 6 in FIG. 4 outside the cutout 7. This means that the lower surface of the front bumper 6 exerts a holding force in the axial direction downward on the uppermost point 14 of the support rib 13 in question, which presses the decoupling ring 8 in the axial direction against the sensor housing 2 of the ultrasonic sensor 1. This holding force can advantageously avoid that water, which can penetrate during cleaning with a high-pressure cleaner between the bumper and the hollow-cylindrical element 15 or between the hollow-cylindrical element 15 and the membrane pot 3, can push the decoupling ring 8 in the axial direction upward out of the cutout 7. Thus, it can be avoided that water can accumulate, and possibly ice up, under the decoupling ring 8, and in particular at the foot point 12, at which the decoupling ring 8, the membrane pot 3 and the sensor housing 2 meet.

In this case, the support rib 13 in question has an archway shape in the axial section shown in FIG. 4. The archway shape is formed in the present example by a bent inner limb 16 and a bent outer limb 17. The limbs 16 and 17 of the archway shape are open in the axial direction toward a lower axial end and converge toward the upper axial end at an uppermost point 14. Accordingly, the archway shape of the support rib 13 spans a cavity 18.

The support rib 13 formed in such a way as to form an archway has a high structural stability in particular, and therefore the support rib 13 can resist the holding force exerted by the front bumper 6 and the decoupling ring 8 is pressed and held stably in the axial direction against the sensor housing 2.

If, instead of the front bumper 6, use is made of a component 6 which is thicker in the axial direction and is flat, an increased force is in action from the flat component 6 to the archway-shaped support rib 13 when the ultrasonic sensor 2 is attached to the flat component. However, the hollow archway-shaped support rib 13 with the slender limbs 16 and 17 can absorb and cushion this increased force without a contact pressure increasing excessively. The archway shape of the support rib 13 further promotes the effect that the support rib 13 in this case is compressed downward in the axial direction and does not tilt away radially laterally outward.

In particular, the radially inner limb 16 in the axial direction on the open side of the archway shape is flush with the lower axial end of the hollow-cylindrical element 15 and is connected to the hollow-cylindrical element 15. In contrast, the axial end of the radially outer limb 17 is a free end. Such a configuration additionally promotes the effect that the support rib is squeezed at high contact pressure and squeezed and compressed radially inward and does not tilt outward.

Figure 5:
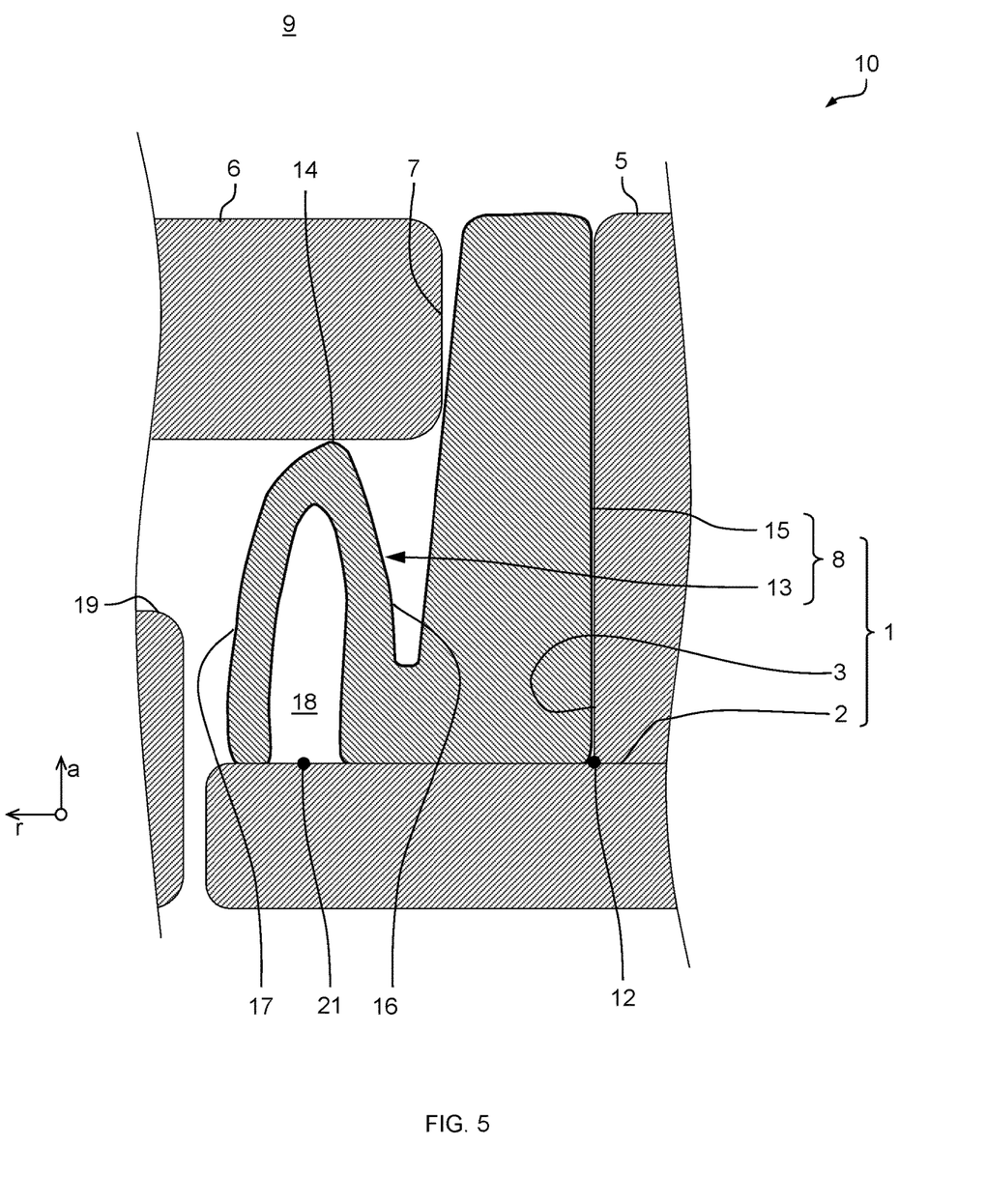
FIG. 5 shows a sectional view of an arrangement with a flat component and an ultrasonic sensor having a decoupling element according to a first exemplary embodiment.
Figure 6:
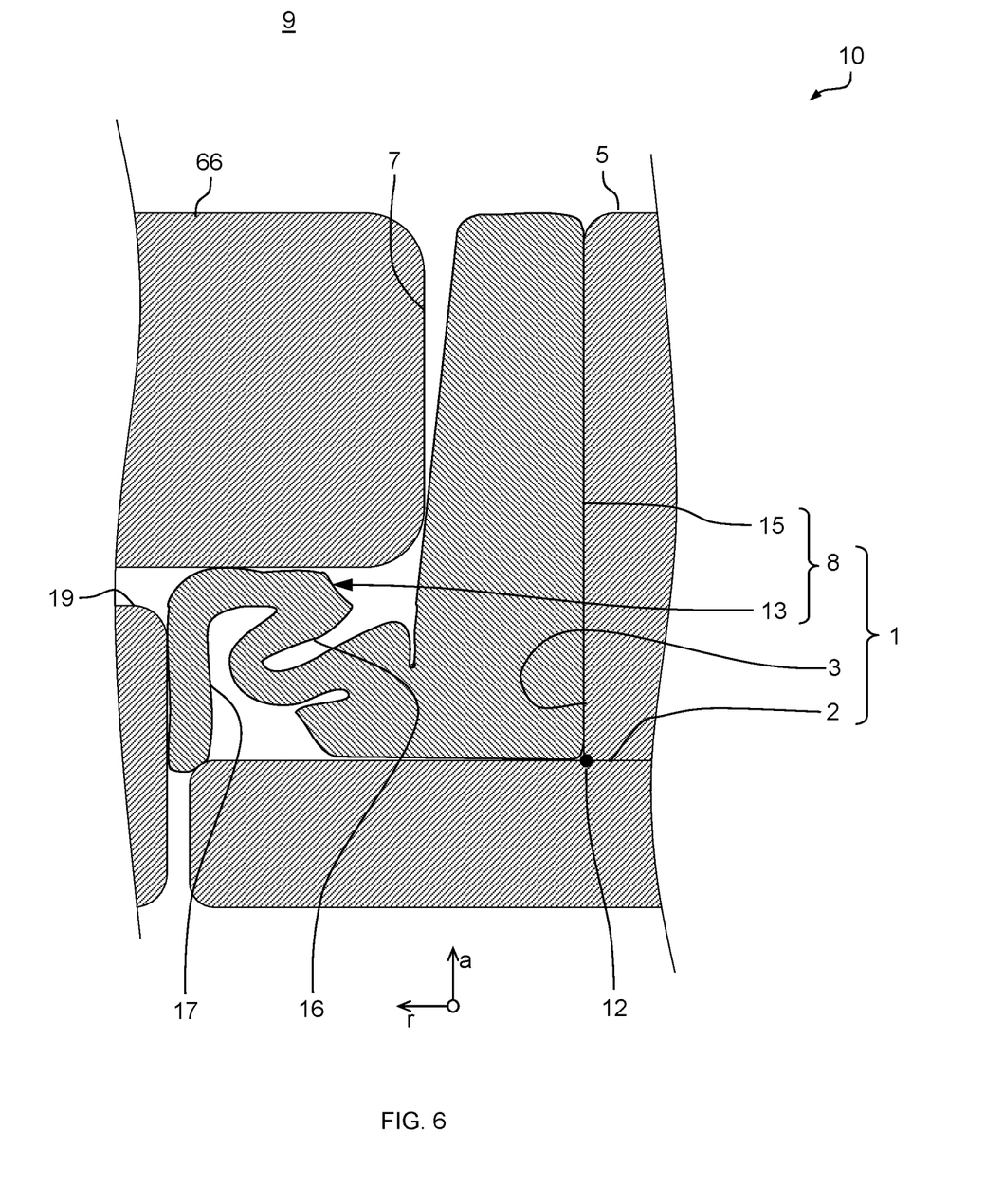
FIG. 6 shows a sectional view of an arrangement with a further flat component and an ultrasonic sensor having a decoupling element according to a first exemplary embodiment.

FIG. 5 and FIG. 6 show sectional views of an arrangement 10 with a flat component 6 and an ultrasonic sensor 2 having a decoupling element 8 according to a second exemplary embodiment. Identical or functionally identical elements have the same reference signs as in the first exemplary embodiment and only the differences will be described.

In FIGS. 5 and 6, in addition to the elements already explained, a portion of a holder 19, which holds the sensor housing 2 in position, is shown. The holder 19 may be arranged such that it limits a movement of the second limb 17 of the archway shape of the support rib 13 outward in the radial direction.

In the case of the decoupling ring (decoupling element) 8 of the second exemplary embodiment, the support rib 13 in question has an archway shape inwardly inclined in the radial direction. That is, an uppermost point 14 of the archway shape is arranged further inward in the radial direction r than a center position 21 between the radially outer limb 17 and the radially inner limb 18 on the axially lower, open side of the archway shape.

In the mounting situation illustrated in FIG. 5, the support rib 14 has a stable archway shape, which derives the force acting on the uppermost point 14 from the front bumper 6 via its two limbs 16 and 17 and in this way ensures that the decoupling ring 8 is pressed in the axial direction against the sensor housing 2 and no gap arises at the foot point 12 that could provide an attack point for pressurized water.

If, in the mounting situation shown in FIG. 5, the front bumper 6 is replaced by a thicker flat component 66 in the axial direction a under conditions which are otherwise unchanged, the mounting situation shown in FIG. 6 results. Owing to the thicker flat component 66, a contact pressure increases and the radially inner limb 16 collapses. However, the support rib 13 does not tilt outward, but rather is squeezed together in the space delimited by the flat component 66, the sensor housing 2, the membrane pot 3 and the holder 19. Thus, even in this situation, the decoupling ring 8 is pressed into the corner, which is formed by the membrane pot 3 and sensor housing 2, at the foot point 12, and it can be effectively avoided, that a water jet of a high-pressure cleaner or the like penetrating from the outside 9 presses the decoupling ring 9 out upward in the axial direction through the cutout 7.

It should be noted that the effect just described is promoted by the holder 19, which delimits the space in which the support rib 13 can collapse. However, the effect just described occurs even if the holder 19 is not provided or not provided at the illustrated position.

As a third exemplary embodiment, a working example for a decoupling ring 8 according to the proposed solution will be described on the basis of FIGS. 7, 8 and 9.

Figure 7:
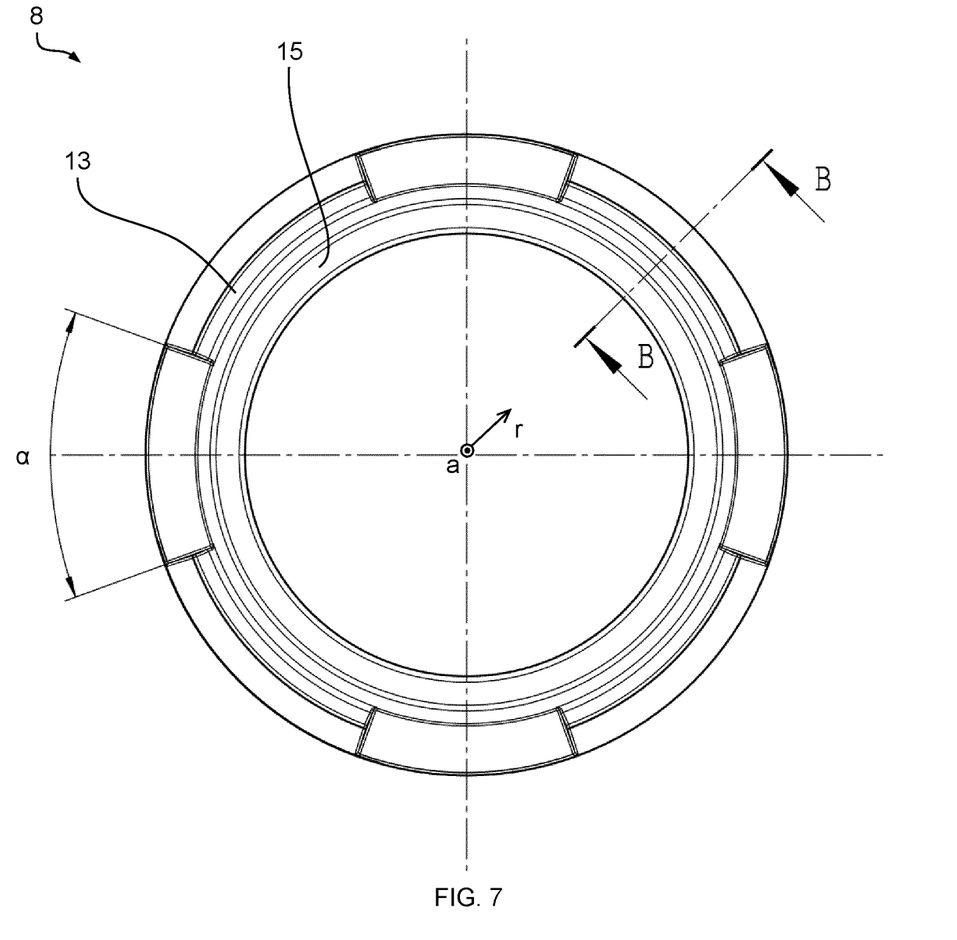
FIG. 7 shows a true-to-scale top view of a decoupling element according to a third exemplary embodiment.

FIG. 7 shows a top view of the decoupling ring 8 of the third exemplary embodiment of a direction referred to in FIGS. 4 to 6 as "top". That is, the axis A of the hollow-cylindrical element 15 extends out of the image plane in FIG. 7.

The decoupling ring 8 has four support ribs 13, which are arranged concentrically radially outwardly around the hollow-cylindrical element 15 and are uniformly spaced apart from one another along the circumferential direction of the hollow-cylindrical element 15 at a distance of $\alpha=40°$ in each case. Accordingly, a support rib 13 in question extends in the circumferential direction over an angular range of 50°. Accordingly, on the one hand, the support ribs 13 have a sufficient rigidity for achieving the effects described here and, on the other hand, sufficiently large angular regions remain between the support ribs 13, via which water which has penetrated can flow off.

Figure 8:
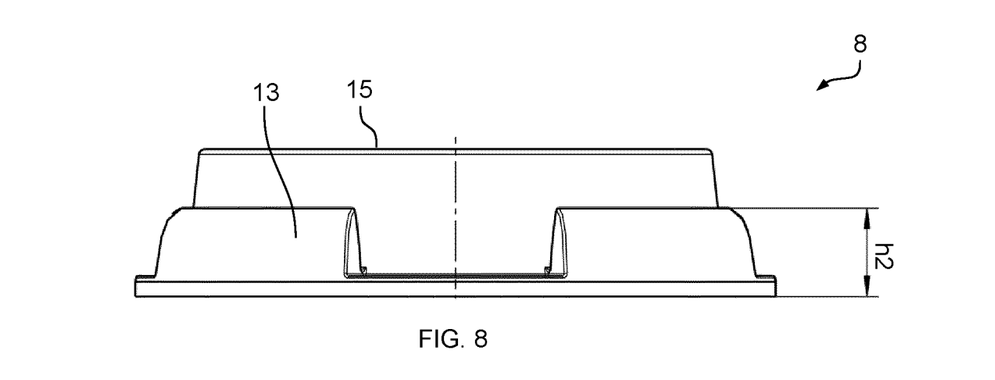
FIG. 8 shows a true-to-scale lateral view of the decoupling element according to the third exemplary embodiment.

FIG. 8 shows a side view of the decoupling ring from FIG. 8. As shown in FIG. 8, the support ribs 13 each have an archway shape, which is open toward a lower end in the axial direction a.

Figure 9:
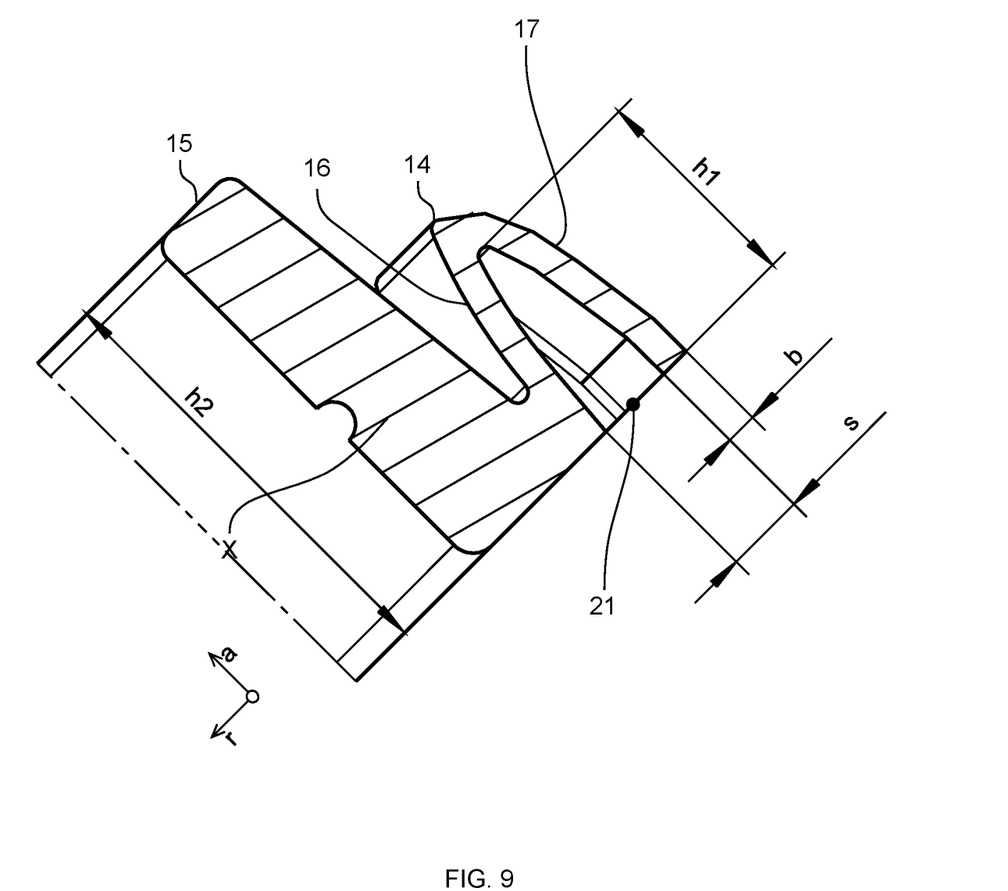
FIG. 9 shows a true-to-scale axial section B-B through the decoupling element of the third exemplary embodiment from FIG. 7.

FIG. 9 shows the section B-B from FIG. 7. The archway shape of the support rib 13 of the decoupling ring 8 of the third exemplary embodiment is also inclined inward; an upper point 14 of the archway shape is located further inward in the radial direction than a center position 21 between the two limbs 16, 17 at the axially lower, open end of the archway shape.

The hollow-cylindrical element 15 has a production-related indentation 22 on its inner circumferential surface. It should be noted that the membrane pot at the axial height of the indentation 22 may have a burr suitable for the indentation 22.

For example, the hollow-cylindrical element 15 of the decoupling ring 8 has an inner diameter of 15 mm and an outer diameter of 17.32 mm, and the decoupling ring 8 including the support ribs 14 has an outer diameter of 21.7 mm. For example, the inner height h1 of the archway shape of the support rib 13 is 2.42 mm. For example, the height h2 of the hollow-cylindrical element is 5 mm. The inner distance between the radially inner limb 16 and the radially outer limb 17 at the lower, open end of the archway shape of the support rib 13 is, for example, 0.91 mm, and a width of the radially outer limb is, for example, 0.36 mm.

The decoupling ring 8 in FIGS. 7-9 has been primary formed integrally by liquid processing of cross-linked silicone and has a hardness of 40 Shore A.

Tests by the inventors have shown that a decoupling ring 8 produced in such a way can be used with flat components 6, the thickness of which in the axial direction a is in a range of 2.5 mm to 4 mm, in a mounting situation in which, as shown in FIG. 4 to FIG. 6, a membrane 5 of a cylindrical membrane pot 3 is arranged substantially flush with an outer surface of a flat component 6, when there are contact pressures that are acceptable in practice and without the sealing function of the decoupling ring 8 being compromised, in particular at the foot point 12. In contrast, a decoupling ring 208 with the same dimensions-if applicable-, which is designed as in the example of FIG. 3 from the prior art, can only accommodate thicknesses in a range of 2.7 mm to 3.3 mm, without the contact pressure becoming prohibitively high or the sealing function being compromised. The proposed decoupling ring 8 from FIGS. 7 to 9 thus has a more advantageous force-displacement curve than the decoupling rings 208 from the prior art.

Although the present invention has been described on the basis of exemplary embodiments, it may be modified in diverse ways.

The decoupling ring does not need to be produced from silicone. For example, it can also be produced from another rubber-like material, such as TPE.

The specific dimensions given in the third exemplary embodiment and the free forms shown in the figures should be considered as being purely by way of example and not limiting.

In all the exemplary embodiments, in a relaxed state of the decoupling ring 8, for example before mounting on the ultrasonic sensor 1, an inner diameter of the hollow-cylindrical element 15 of the decoupling ring may preferably be less than an outer diameter of the membrane pot 3 of the ultrasonic sensor 1, and therefore the decoupling ring 8 fits with an undersize on the membrane pot 3.

In the exemplary embodiments, a front bumper 6 has been given as an example for the flat component 6. However, the flat component 6 may also be a rear bumper, a sidebar or any other external peripheral surface of a vehicle 50. In the cases mentioned above, the inner side of the flat component is a vehicle inner side, and the ultrasonic sensor 1 records information about an environment 9 of the vehicle 50. As an alternative thereto, however, the ultrasonic sensor 1 may also record information about a vehicle interior. In this case, the outer side of the flat component 6 is a vehicle inner side, and the flat component 6 is any element of an interior trim panel of the vehicle 50.

A passenger car has been illustrated purely by way of example as the vehicle 50. However, the proposed ultrasonic sensor, the proposed arrangement and the proposed decoupling element are also used in other moving or movable objects that have a driving assistance system, a parking assistance system and/or a system for partially or fully autonomous driving, such as in trucks, fork-lift trucks, robots, and the like.

LIST OF REFERENCE SIGNS 1 ultrasonic sensor
2 sensor housing
3 ultrasonic transceiver element, membrane pot
4 wall, lateral surface
5 membrane
6 flat component, front bumper
7 cutout
8 decoupling element
9 vehicle environment
10 arrangement with flat component and ultrasonic sensor having a decoupling element
11 contact point
12 foot point
13 archway-shaped support rib
14 uppermost point of the archway shape
15 hollow-cylindrical element
16 radial inner limb of the archway shape
17 radial outer limb of the archway shape
18 cavity
19 holder
21 center position
22 indentation
50 vehicle, passenger car
66 thick flat component
100 known arrangement with a flat component and ultrasonic sensor having a decoupling element
101 known ultrasonic sensor
108 known decoupling element
200 known arrangement with a flat component and ultrasonic sensor having a decoupling element
201 known ultrasonic sensor
208 known decoupling element
213 known spacer element
214 top side of the known spacer element
215 known hollow-cylindrical element
A axis of the hollow-cylindrical element
a axial direction, in particular axial direction upward
h1 inner height of the archway shape
h2 height of the hollow-cylindrical element
r radial direction, in particular radial direction outward
α distance in circumferential direction between support ribs
S inner distance between the limbs at the open end of the archway shape
b width of the radially outer limb

The invention claimed is:

1. A decoupling element for an ultrasonic sensor, wherein the ultrasonic sensor is able to be attached to a flat component for a vehicle,
wherein the flat component comprises a cutout, and
wherein the ultrasonic sensor comprises a cylindrical ultrasonic transceiver element which is able to be introduced into the cutout,
wherein the decoupling element comprises:
a hollow-cylindrical element for enclosing the cylindrical ultrasonic transceiver element of the ultrasonic sensor; and
a plurality of support ribs which are arranged in the radial direction outside the hollow-cylindrical element and are spaced apart from one another in a circumferential direction of the hollow-cylindrical element for supporting the decoupling element on a region of the flat component outside the cutout when the cylindrical ultrasonic transceiver element with the hollow-cylindrical element enclosing it is introduced by an end portion at an axial end into the cutout,
- wherein a respective support rib in an axial section of the decoupling element is of an archway shape which is open in the axial direction toward another axial end of the hollow-cylindrical element.

2. The decoupling element as claimed in claim 1, wherein the archway shape is inclined inward in the radial direction.

3. The decoupling element as claimed in claim 1,
- wherein each of two limbs of the archway shape is at least twice as long as an inner distance between the limbs on the open side of the archway shape.

4. The decoupling element as claimed in claim 1,
- wherein one end of a radially inner limb of the archway shape in the axial direction on the open side of the archway shape in the axial direction is flush with the other axial end of the hollow-cylindrical element and is connected to the hollow-cylindrical element.

5. The decoupling element as claimed in claim 1,
- wherein one of the support ribs extends in the circumferential direction of the hollow-cylindrical element over an angular range of 30° to 60°.

6. The decoupling element as claimed in claim 1, wherein the decoupling element is formed integrally.

7. The decoupling element as claimed in claim 1,
- wherein at least the support ribs are formed from a material having a hardness of 20 to 60 Shore A.

8. The decoupling element as claimed in claim 1,
- wherein the decoupling element is formed from a flexible material.

9. An ultrasonic sensor comprising a cylindrical ultrasonic transceiver element and the decoupling element as claimed in claim 1,
- wherein the hollow-cylindrical element of the decoupling element encloses the cylindrical ultrasonic transceiver element.

10. An arrangement with a flat component for a vehicle, the flat component comprising a cutout, and an ultrasonic sensor as claimed in claim 9, which is attached to the flat component,
- wherein the cylindrical ultrasonic transceiver element with the hollow-cylindrical element enclosing it of the decoupling element is introduced by the end portion at the one axial end into the cutout,
  - wherein the decoupling element is supported on a region of an inner side of the flat component outside the cutout.

11. The arrangement as claimed in claim 10,
- wherein an axial end of the cylindrical ultrasonic transceiver element and of the hollow-cylindrical element enclosing it of the decoupling element is flush with an outer side of the flat component.

12. The arrangement as claimed in claim 10,
- wherein the flat component is an outer peripheral surface of the vehicle, the outer side of the flat component is a vehicle outer side, and the inner side of the flat component is a vehicle inner side, or
- wherein the flat component is an interior trim panel of the vehicle, the outer side of the flat component is a vehicle inner side, and the inner side of the flat component is a vehicle outer side.

13. The arrangement as claimed in claim 10,
- wherein the ultrasonic sensor is pressed with the decoupling element into the cutout of the flat component under a predefined contact pressure.

14. The arrangement as claimed in claim 10,
- wherein the hollow-cylindrical element of the decoupling element is attached with an undersize on the cylindrical ultrasonic transceiver element.

15. A motor vehicle comprising at least one arrangement as claimed in claim 10.

* * * * *